(12) United States Patent
Hind et al.

(10) Patent No.: US 6,665,721 B1
(45) Date of Patent: Dec. 16, 2003

(54) ENABLING A HOME NETWORK REVERSE WEB SERVER PROXY

(75) Inventors: John R. Hind, Raleigh, NC (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,591

(22) Filed: Apr. 6, 2000

(51) Int. Cl.[7] .............................................. G06F 15/173
(52) U.S. Cl. ....................... 709/227; 709/203; 709/219; 709/225; 709/243; 707/10; 707/513; 705/52; 370/252
(58) Field of Search ................................ 709/203, 219, 709/225, 227, 243; 705/52; 707/10, 513; 370/252

(56) References Cited

U.S. PATENT DOCUMENTS

| | | | | |
|---|---|---|---|---|
| 5,673,322 A | * | 9/1997 | Pepe et al. ..................... 705/52 |
| 6,182,141 B1 | * | 1/2001 | Blum et al. .................. 709/227 |
| 6,243,760 B1 | * | 6/2001 | Armbruster et al. ........ 709/243 |
| 6,327,608 B1 | * | 12/2001 | Dillingham .................. 709/203 |
| 6,389,422 B1 | * | 5/2002 | Doi et al. ....................... 707/10 |
| 6,463,447 B2 | * | 10/2002 | Marks et al. ................ 707/513 |
| 6,473,407 B1 | * | 10/2002 | Ditmer et al. .............. 370/252 |
| 6,507,867 B1 | * | 1/2003 | Holland et al. ............. 709/219 |
| 6,510,464 B1 | * | 1/2003 | Grantges et al. ............ 709/225 |

* cited by examiner

*Primary Examiner*—Hosain Alam
*Assistant Examiner*—Thu Ha Nguyen
(74) *Attorney, Agent, or Firm*—Jeanine S. Ray-Yarletts; Marcia L. Doubet

(57) ABSTRACT

A computer network, method, apparatus or program product utilizing a local web server, a reverse proxy and an internet hosting web server to allow one or more remote users to access information on the local web server by accessing a proxy servlet residing at the internet hosting web server, wherein the reverse proxy initiates a connection with the proxy servlet. The proxy servlet intercepts all of the communications from one or more remote users and routes the communication to the local web server. The reverse proxy then routes the response to the request to the proxy servlet.

24 Claims, 4 Drawing Sheets

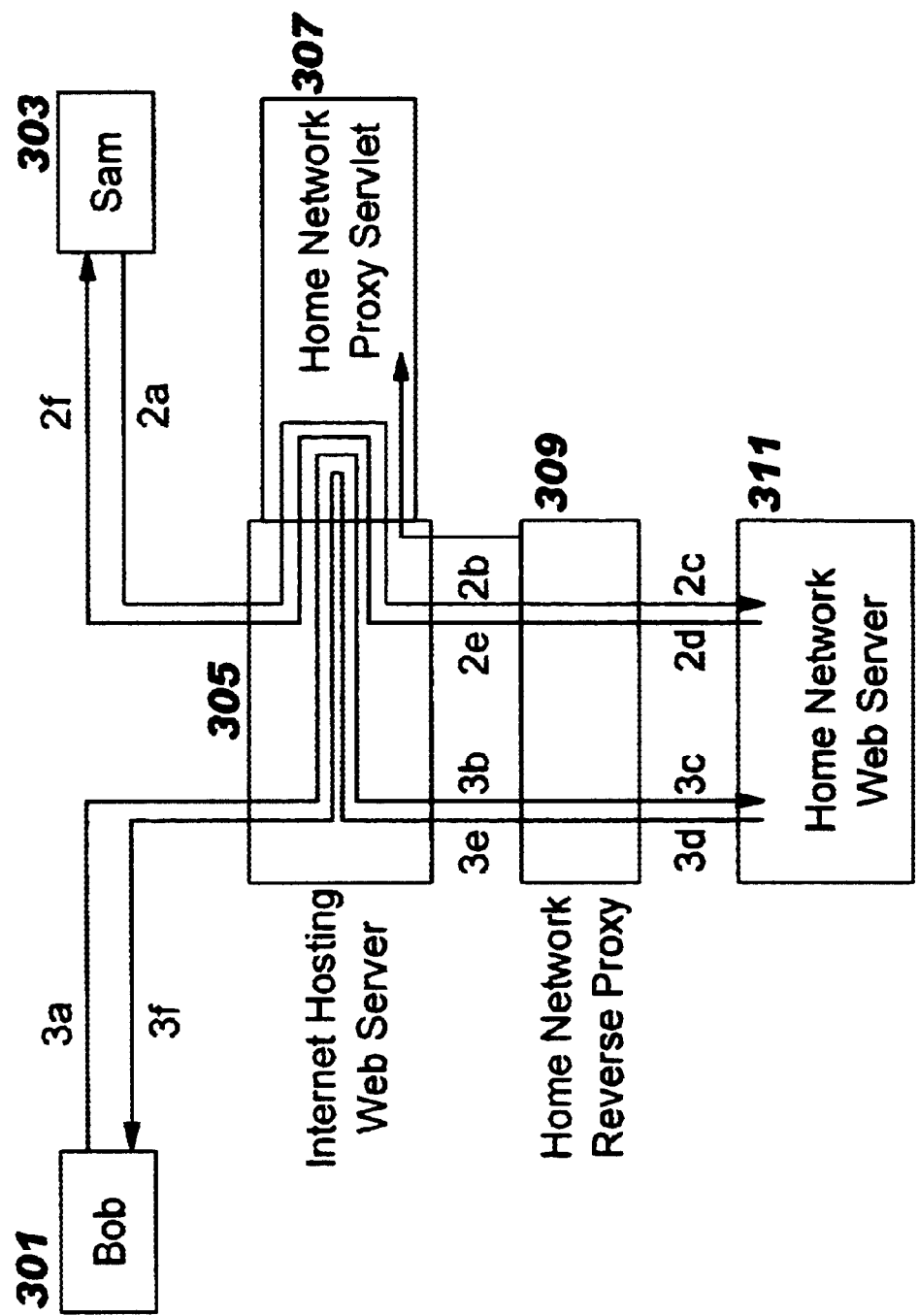

ENABLING A HOME NETWORK REVERSE WEB SERVER PROXY

BACKGROUND

The Internet is a means of sharing and transporting information which has become pervasive in society. It is based on TCP/IP (Transmission Control Protocol/Internet Protocol) A large number of homes in the United States are connected to the Internet using one or more computers. Users generally connect to the Internet from their homes by way of an Internet Service Provider (ISP). (See, for example, FIG. 1, where users at devices 101, 107, 109 connect 103, 111, 113 to an ISP 105.) The number of Internet Service Providers (ISPs) has grown at a phenomenal rate. The exponential growth in people using the Internet has resulted in modifications to TCP/IP (the protocol supporting the Internet) to enable more users to access the Internet. It has also resulted in the use of aliases and proxies to replicate information and provide additional access to information.

When the ISPs started competing for customers, they intended customers to use their high speed connections for exchanging mail, surfing the WEB and playing internet-hosted information such as movies, CDS, games, etc. The ISPs did not intend their customers to use the connections for a dynamic source of content. With this in mind, many ISPs implemented a technology called IP Network Address Translation (NAT) as a means of connecting the large number of home users to the Internet without using a larger number of registered addresses (since the registered addresses are a limited resource, hence expensive). The specifications for NAT are set out in the IETF's (Internet Engineering Task Force) RFC (Request for Comment) 1631. The NAT implementation places network address translators at the borders of stub domains as shown in FIG. 2. Each NAT box has a table consisting of pairs of local IP addresses and globally unique addresses. The IP addresses inside the stub domain are not globally unique. They are reused in other domains. The NAT can be installed without changes to the routers or the hosts, thereby making it very attractive to rapidly growing ISPs.

The ISPs also use DHCP (Dynamic Host Configuration Protocol) or PPP (Point-to-Point Protocol) to dynamically assign private addresses to customer equipment, and use transparent proxies (for things such as news, mail and multi-media information) as a way of minimizing backbone traffic. NAT, DHCP/PPP and transparent proxies solved the addressing problems in expanding always-connected home networks, reduced the costs of provider's backbones and helped restrain hackers from taking advantage of open ports to end-user equipment, but these steps resulted in the inability of the home network to be accessed from the Internet. The home network has no permanent externally-visible address and connections must originate at the home network. This means that, should a user want to access their home security camera from their internet connection at work, they would be unable to do so given the present technology and a standard ISP Internet connection.

While the need for conventions such as NAT and DHCP/PPP have been reduced by the introduction of IP v6 (Internet Protocol version 6), the changes required for IP v6 are rather significant and a vast majority of the installations will still implement the NAT, DHCP/PPP conventions when they upgrade from IP v4 to IP v6.

SUMMARY OF THE INVENTION

With the roll out of 'always on' or continuously available high speed connectivity via cable and Digital Subscriber Lines (DSL) to the home and small business comes the possibility of some interesting server-based personal applications that rely on dynamic data being shared by small groups. The simplest form of this is monitoring and control of the home, for example, being able to view the security camera, listen to one's pet, turn on or off lights, remotely control appliances like the microwave, . . . etc. A simple extension of the concept leads to remote access of one's personal applications on the home PC such as an electronic money application, personal calendar, CD catalog database, and so forth. Extending access to family members, friends and business associates becomes a natural progression, turning one's home network into a personal application-hosting environment.

Since the ISPs are using NAT, DHCP/PPP and transparent proxies to reduce their costs and to limit the ability of attackers to take advantage of open ports on end-user equipment, the ability to host applications on a person's home network that is accessible to others is limited.

Up to this point, there has been no general solution to this situation, but it is clear from present convention that the need exists. Webcams represent the state of today's art in dealing with this situation, making images snapped in the home generally available on the Internet by way of a Web server located at an internet addressable hosting site or as eMail sent to a small list of mail-boxes. For the Web case, a program running on the home network, for example, monitors a security camera looking for motion. When this is detected, the program creates an HTTP or FTP session to the Web hosting site, transferring a pre-agreed named still image from the camera to the server, where the named image has been referenced in a static HTML (Hypertext Markup Language) page which has been marked up with auto-refresh header information. One could then monitor one's home from the office by displaying the web page on one's office browser. This kind of specialized solution works only to the degree that the home network can predict what information will be needed and is able to stage this on the hosting server. It also assumes that there is no need for modifying home information/systems from the Internet.

The solution set forth with the present invention avoids these limitations of the present art by modifying the Internet hosting site with a proxy servlet which, in conjunction with a home network reverse proxy, allows a web server on the home network to be seen from the Internet as a URL at the Internet based hosting site. By using the HTTP protocol originating at the home network reverse proxy and flowing to the hosting site, this solution looks to the ISP as if a web browser was simply surfing the internet and hence is totally transparent to the NAT, DHCP/PPP, and transparent proxy technologies which the ISP might employ. To accomplish this, the request/response meaning of HTTP within the channel between the home network reverse proxy and the internet hosting server is reversed.

OBJECTS OF THE INVENTION

It is an object of the present invention to allow users to access their home network remotely when their ISP has provided service using NAT and/or DHCP/PPP and/or other network aliasing.

It is yet another object of the present invention to allow users to access personal applications on their home network remotely using their ISP connection.

It is yet another object of the present invention to extend the above access to other authorized users.

BRIEF DESCRIPTION OF THE DRAWINGS

FIG. 4 is a pictorial representation of the information flow between users and the home network utilizing the present invention.

DETAILED DESCRIPTION OF THE PREFERRED EMBODIMENT

Figure 1:
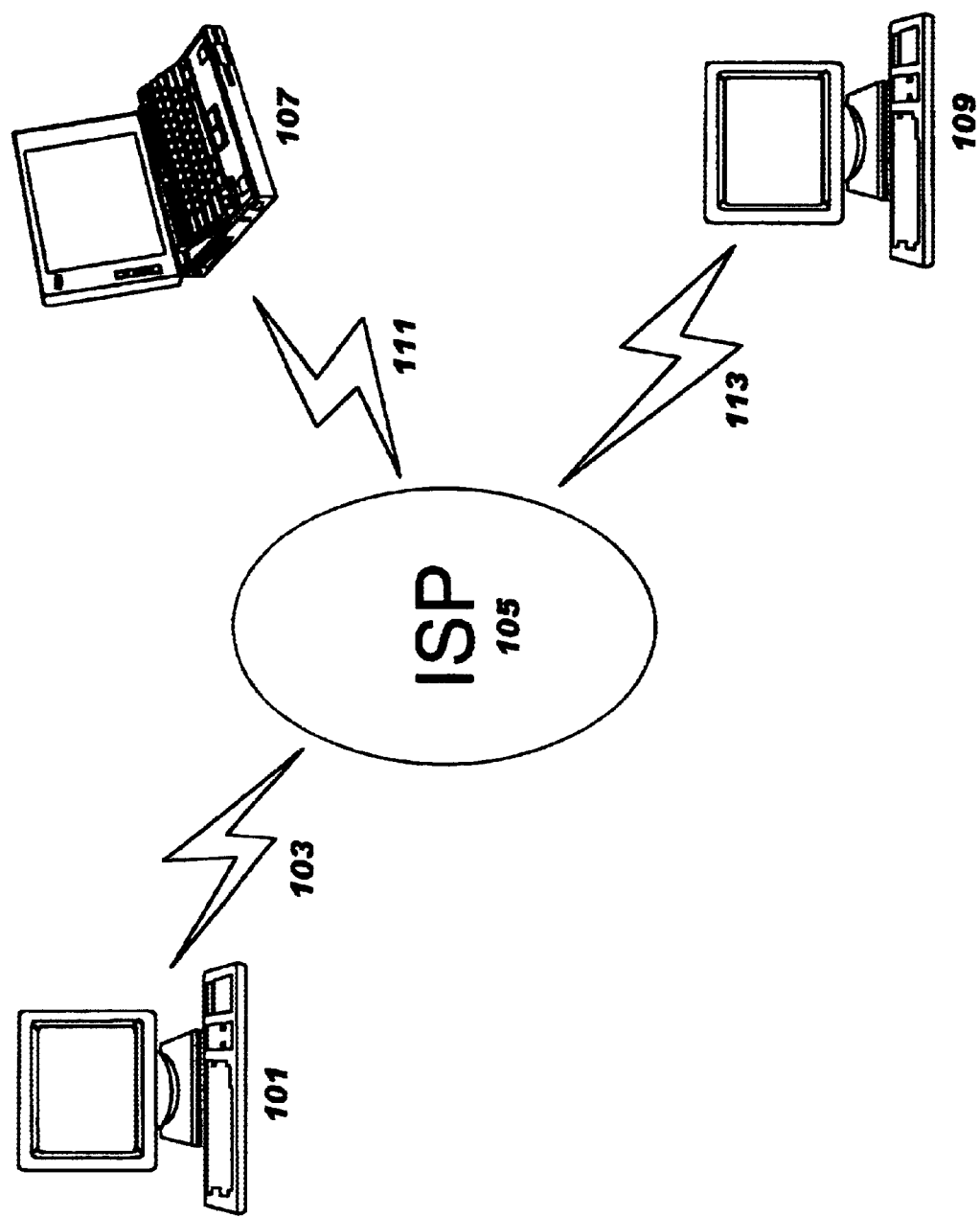
FIG. 1 is diagram of a network in which the present invention may be implemented.
Figure 2:
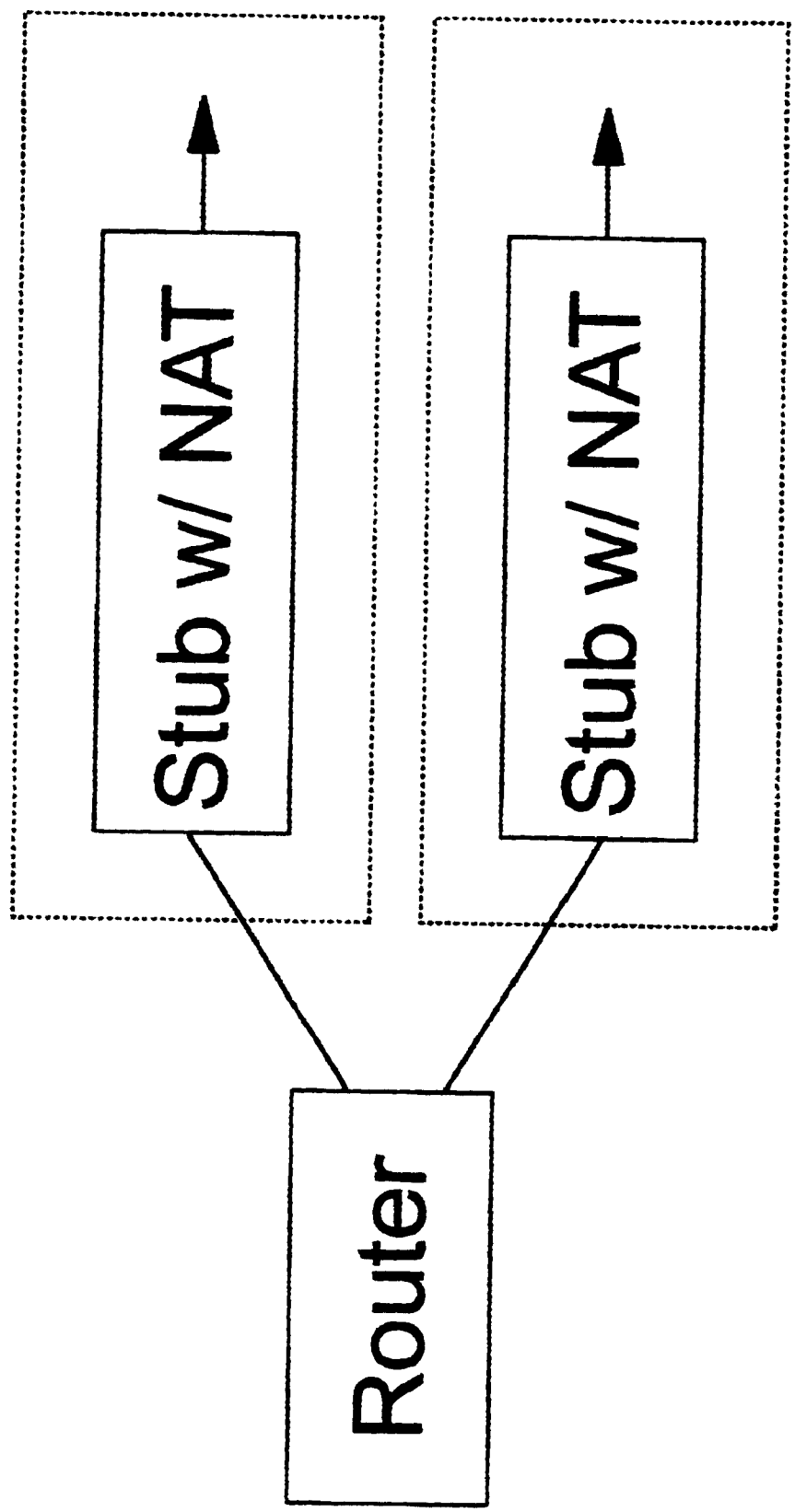
FIG. 2 is a block diagram of a network implementing NAT.

The above mentioned objectives, as well as others, will be described in detail with respect to a preferred embodiment of the present invention as well as to the Figures presented herein. Like numbers in the figures represent the same elements. The preferred embodiment is presented as an example only and is not meant to limit the stated invention or claims in any manner. The preferred embodiment employs MIME (Multipurpose Internet Mail Extensions) multi-part document encoding on all request/response sequences flowing between the servlet and the reverse proxy except for the initial sign on request. In this encoding part one contains the original HTTP header context of the actual browser client request or the header context of the home web server response. The MIME format is described in detail in the IETF's RFC 2045.

While many formats are possible for this control information, an XML (Extensible Markup Language) document with namespace notation was chosen that allows the representation of present and future extensions to the tunneled HTTP flows and allows a side-band servlet-to-proxy control channel for such purposes as communicating timer and queue information, allowing optimization of the flow.

While HTTP 1.0 can be used between the servlet and proxy, HTTP 1.1 offers a significant advantage in that it allows a single TCP/IP session to be reused for multiple request/response flows, it provides for chunking (or segmenting) of document data, and it formalizes the representation of multi-part documents and cache controls. Cookies in the actual HTTP headers in the to servlet-to-proxy channel are used by the internet host servlet to relate the incoming internet URL request from the remote user (which is translated to the channel response) to the home network reverse proxy HTTP channel post request that is used to send a response document from the home network web server. All real channel flows are, of course, marked non-cacheable.

The present invention involves a local web server, a reverse proxy, and an internet hosting web server connected using a computer network. There are one or more remote users accessing information on the local web server by accessing a proxy servlet residing at the internet hosting web server. The reverse proxy initiates a connection with the proxy servlet, preferably using HTTP. The proxy servlet intercepts all of the communications from the remote users and routes the communications to the local web server, preferably using an HTTP response to the reverse proxy. The reverse proxy routes the response to the remote user's request to the proxy servlet by way of a new HTTP request. Also, multi-part MIME encoding may be used to provide both a control channel and an application data channel between the reverse proxy and the proxy servlet so that standards-based application documentation encodings may be used to carry application data. (This control channel allows end-station HTTP headers to be exchanged between the proxy servlet and the reverse proxy, and also allows negotiation of channel-handling characteristics between these components.) As stated above, the present example is given to teach the reader an exemplary method of implementing the invention and is not meant to limit the invention in any way. It will be clear to one skilled in the art that modifications to this implementation can be made without changing the underlying invention.

Figure 3:
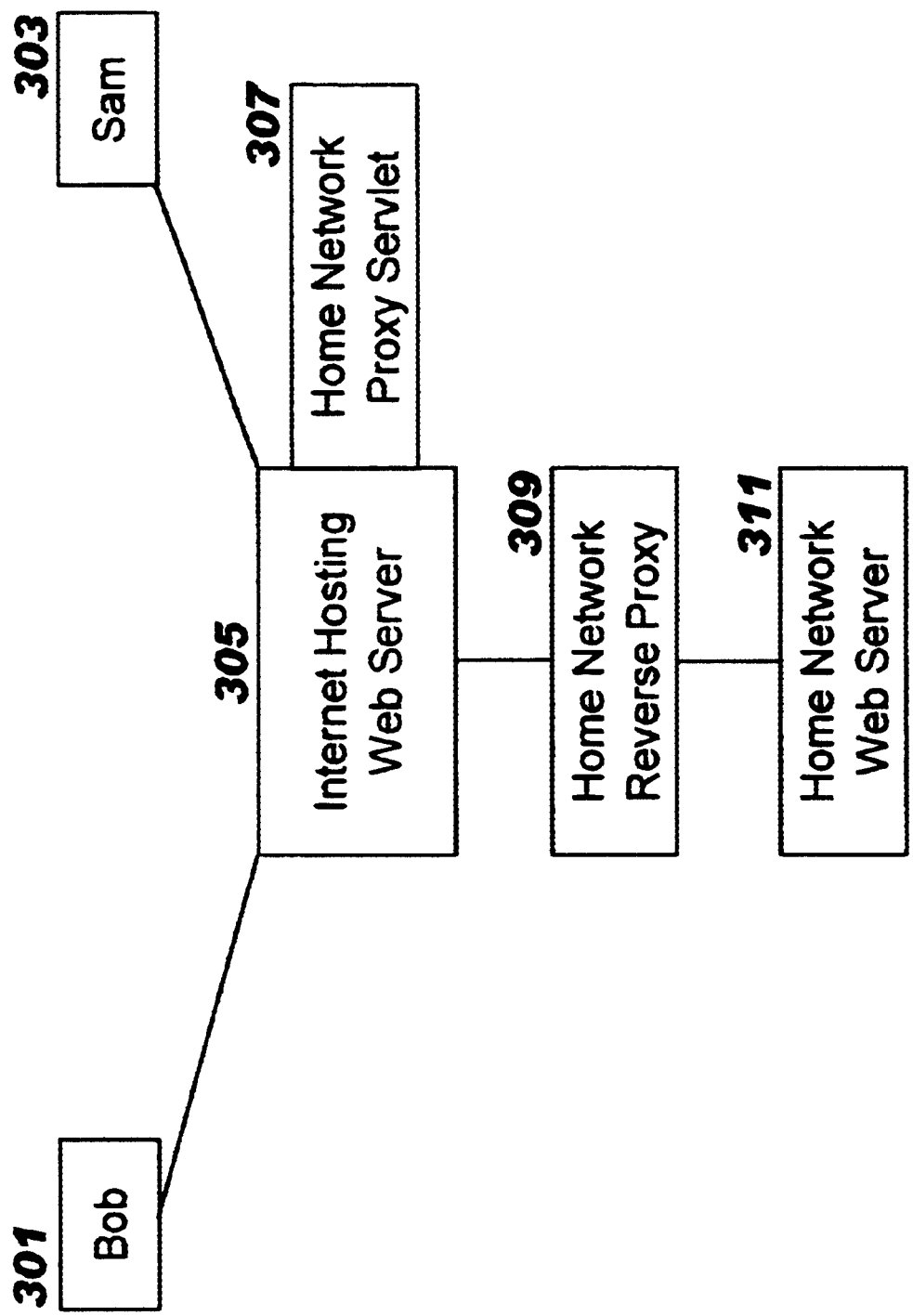
FIG. 3 is a block representation of how the information traverses the preferred embodiment of the present invention.

Referring to FIG. 3, FIG. 3 is a block diagram of the components in the preferred embodiment of the present invention. There is a Home Network Web Server 311 which is connected to a Home Network Reverse Proxy 309 by any connecting means such as a Local Area Network (LAN), a telephone connection, cable connection, power line modulation link or a short range radio link. The Home Network Reverse Proxy 309 is then connected to the Internet Hosting Web Server 305 which has a Home Network Proxy Servlet 307 running via the respective ISP network. The Internet Hosting Web Server 305 communicates with the users 301,303 via any supported Internet connection.

FIG. 4 depicts a sample flow of information used in the preferred embodiment of the present invention. For this example, it is assumed that the ISP has just reset the connection to the home network so the reverse proxy 309 has issued a sign on request 1 to the internet hosting server 305 (e.g., home.net) to build a new connection from the newly-assigned address. Sam 303, one of Bob's friends, has just requested a copy of Bob's personal calendar (using message flow 2*a*) and Bob is just finishing adding an entry to his calendar (using message flow 3*a*) by filling in a cached form from the browser on his office PC.

Since an inbound request to the Internet hosting server 305 must wait for an inbound request from the reverse proxy 309 so that the request can be converted (by the proxy servlet) to an XML representation for transmission to the reverse proxy 309 in a response to the reverse proxy's request, the servlet must provide a temporary queue for this purpose. It should also be noted that since HTTP is basically half duplex (i.e., send a request, then wait for the response), that one would need to allow several connections between the reverse proxy and the Internet hosting server to optimally use the bandwidth available and reduce the queue waiting times at the Internet hosting server.

The conversion of the inbound requests to an XML representation must be performed in an extendable manner as the type of content transmitted in the request can never be assumed to be a fixed set of values. To support this, an XML representation must utilize an extra level of indirection to request content to ensure that all components can be supported. For example, the following XML representation uses explicit elements, such as "Content-Type", for components of the request:

<httpheader>
<Content-Type>
<text/html
</Content-Type>
</httpheader>

Eventually, new element values will need to be added to the XML representation. In contrast, having a representation such as the following permits the requests to be modeled as an unlimited set of values.

<httpheaderentry>
<attribute>
Content-Type
</attribute>
<value>
text/html </value>
</httpheaderentry>

A specific example of the flows of the preferred embodiment of the present invention will be discussed with respect to FIG. 4, referencing the example above. First we will address Sam's request to view Bob's calendar of the previous example. From the Home Network Reverse Proxy 309, a sign on request is sent with a password (message flow 1). This request is sent to the Home Network Proxy Servlet 307 running in the Internet Hosting Web Server 305. A request 2a is then sent from the computer at which Sam resides 303, requesting to view Bob's calendar on Bob's home system. The request goes from Sam's machine 303, through the Proxy Servlet 307, where it is turned into a response 2b to sign on request 1. The response also has a cookie identifying Sam (i.e., the requesting user) and an XML document (i.e. the converted request received from Sam, indicating a get/calendar request and including other headers). The response flows through the Home Network Reverse Proxy 309, where it is transformed into an HTTP request 2c for the local calendar (i.e.. Bob's calendar, which is stored at local server 311). This HTTP request 2c is sent to the Home Network Server 311. An HTTP response 2d containing the calendar document is sent from the Home Network Web Server 311 to the Home Network Reverse Proxy 309, where it is converted to an HTTP post request 2e identifying the cookie of Sam and an XML document containing response headers and the calendar document. The response is sent through the Proxy Servlet 307 at the Internet Hosting Web Server 305 as an HTTP response 2f to the calendar request 2a. Further, Bob 301 is posting an entry to his home calendar from his remote computer. His post calendar entry request 3a goes to the Proxy Servlet 307 of the Internet Hosting Web Server 305 and is transformed into an HTTP response 3b, a cookie identifying Bob and an XML document identifying the calendar post request. The Home Network Reverse Proxy 309 receives that response 3b and converts it to a local post calendar entry request form 3c and submits it the post request to the Home Network Web Server 311. The Home Network Web Server 311 then sends a response document 3d for the updated calendar to the Home Network Reverse Proxy 309 which creates the HTTP post request 3e and the cookie identifying Bob and the XML document identifying the calendar update. Reverse proxy 309 sends this post request 3e to the Proxy Servlet 307 of the Internet Hosting Web Server 305, which converts it to response message 3f. Response message 3f is transmitted to Bob's office computer 301 as a response to the update calendar request 3a.

What is claimed is:

1. A computer network comprising:

a local web server;

a reverse proxy connected to the local web server by first network connecting means;

an internet hosting web server having a proxy servlet and being connected to the reverse proxy by second network connecting means; and one or more remote users, wherein said one or more remote users are able to access information on said local web server by accessing, by third network connecting means, said proxy servlet residing at said internet hosting web server, wherein said reverse proxy initiates a connection with said proxy servlet by sending a request to the proxy servlet, said proxy servlet intercepts requests sent from said one or more remote users and routes each intercepted request to the local web server by way of the reverse proxy (as a response to the request sent by the reverse proxy), wherein the reverse proxy then forwards the intercepted request to the local web server, and said reverse proxy routes to the proxy servlet via the internet hosting web server, the local web server's response to the forwarded request by sending a new request to the proxy servlet (to which the proxy servlet can respond with another one of the intercepted request), and the proxy servlet then forwards the local web server's response to the remote user whose request was intercepted.

2. The computer network as claimed in claim 1, wherein said reverse proxy initiates said connection with said proxy servlet using an HTTP (Hypertext Transfer Protocol) protocol, the response with which said proxy servlet routes each intercepted request to said local web server by way of said reverse proxy is an HTTP response, and the new request with which said reverse proxy routes the local web server's response to the proxy servlet is a new HTTP request.

3. The computer network as claimed in claim 1, wherein multi-part MIME encoding is used to provide both a control channel and an application data channel between the reverse proxy and the proxy servlet.

4. The computer network as claimed in claim 3, wherein the control channel is represented by an extensible markup language document that allows end-station HTTP headers to be exchanged between the proxy servlet and the reverse proxy and allows negotiation of channel handling characteristics between the proxy servlet and the reverse proxy.

5. The computer network as claimed in claim 1, wherein the internet hosting web server provides virtual hosting support which allows the local web server to be viewed by the remote users with it's own host and domain name.

6. The computer network as claimed in claim 2, wherein multiple outstanding HTTP requests between the reverse proxy and the proxy servlet exist to allow overlapped end station operations in which cookies or other HTTP header annotations are used to relate outstanding remote-user requests flowing from the proxy servlet to the reverse proxy as HTTP responses to a corresponding one of the local web server's responses flowing from the reverse proxy to the proxy servlet as HTTP requests.

7. A system comprising:

a local web server;

a reverse proxy connected to the local web server by first network connecting means;

an internet hosting web server having a proxy servlet and being connected to the reverse proxy by second network connecting means; and one or more remote users, wherein the remote users are able to access information on said local web server by accessing, by third network connecting means, said proxy servlet residing at said internet hosting web server, wherein said reverse proxy initiates a connection with said proxy servlet by sending a request to the proxy servlet, said proxy servlet intercepts requests sent from said one or more remote users and routes each intercepted request to the local web server by way of the reverse proxy (as a response to the request sent by the reverse proxy), wherein the reverse proxy then forwards the intercepted request to the local web server, and said reverse proxy routes, to the proxy servlet via the internet hosting web server, the local web server's response to the forwarded request by sending a new request to the proxy servlet (to which the proxy servlet can response with another one of the intercepted request), and the proxy servlet then forwards the local web server's response to the remote user whose request was intercepted.

8. The system as claimed in claim 7, wherein said reverse proxy initiates said connection with said proxy servlet using an HTTP (Hypertext Transfer Protocol) protocol, the response with which said proxy servlet routes each intercepted request to said local web server by way of said reverse proxy is an HTTP response, and the new request with which said reverse proxy routes the local web server's response to the proxy servlet is a new HTTP request.

9. The system as claimed in claim 7, wherein multi-part MIME encoding is used to provide both a control channel and an application data channel between the reverse proxy and the proxy servlet.

10. The system as claimed in claim 9, wherein the control channel is represented by an extensible markup language document that allows end-station HTTP headers to be exchanged between the proxy servlet and the reverse proxy and allows negotiation of channel handling characteristics between the proxy servlet and the reverse proxy.

11. The system as claimed in claim 7, wherein the internet hosting web server provides virtual hosting support which allows the local web server to be viewed by the remote users with it's own host and domain name.

12. The system as claimed in claim 8, wherein multiple outstanding HTTP requests between the reverse proxy and the proxy servlet exist to allow overlapped end station operations in which cookies or other HTTP header annotations are used to relate outstanding remote-user requests flowing from the proxy servlet to the reverse proxy as HTTP responses to a corresponding one of the local web server's responses flowing from the reverse proxy to the proxy servlet as HTTP requests.

13. A method for enabling one or more remote users to access information on a local web server by accessing a proxy servlet residing at an internet hosting web server, wherein a reverse proxy initiates a connection with the proxy servlet by sending a request to the proxy servlet, the proxy servlet intercepts requests sent from the one or more remote users and routes each intercepted request to the local web server by way of the reverse proxy (as a response to the request sent by the reverse proxy), wherein the reverse proxy then forwards the intercepted request to the local web server, and the reverse proxy routes, to the proxy servlet, the local web server's response to the forwarded request by sending a new request to the proxy servlet (to which the proxy servlet can respond with another one of the intercepted requests), and the proxy servlet then forwards the local web server's response to the remote user whose request was intercepted.

14. The method as claimed in claim 13, wherein the reverse proxy initiates the connection with the proxy servlet using an HTTP (Hypertext Transfer Protocol) protocol, the response with which the proxy servlet routes each intercepted request to the local web server by way of the reverse proxy is an HTTP response, and the new request with which the reverse proxy routes the local web server's response to the request to the proxy servlet is a new HTTP request.

15. The method as claimed in claim 13, wherein multi-part MIME encoding is used to provide both a control channel and an application data channel between the reverse proxy and the proxy servlet.

16. The method as claimed in claim 15, wherein the control channel is represented by an extensible markup language document that allows end-station HTTP headers to be exchanged between the proxy servlet and the reverse proxy and allows negotiation of channel handling characteristics between the proxy servlet and the reverse proxy.

17. The method as claimed in claim 13, wherein the internet hosting web server provides virtual hosting support which allows the local web server to be viewed by the remote users with it's own host and domain name.

18. The method as claimed in claim 14, wherein multiple outstanding HTTP requests between the reverse proxy and the proxy servlet exist to allow overlapped end station operations in which cookies or other HTTP header annotations are used to relate outstanding remote-user requests flowing from the proxy servlet to the reverse proxy as HTTP responses to a corresponding one of the local web server's responses flowing from the reverse proxy to the proxy servlet as HTTP requests.

19. A computer program product for enabling one or more remote users to access information on a local web server by way of a reverse proxy and an internet hosting web server, said computer program product embodied on computer readable media and comprising:

computer readable code means for initiating a connection, by the reverse proxy, with the proxy servlet, by sending a request to a proxy servlet residing at the internet hosting web server;

computer readable code means for intercepting, by the proxy servlet, requests sent from the one or more remote users;

computer readable code means for routing each intercepted request, by the proxy servlet, to the local web server by way of the reverse proxy (as a response to the request sent by the reverse proxy), whereby the reverse proxy then forwards the intercepted request to the local web server;

computer readable code means for routing, to the proxy servlet by the reverse proxy, the local web server's response to the forwarded request by sending a new request to the proxy servlet (to which the proxy servlet can respond with another one of the intercepted request); and computer readable code means for forwarding the local web server's response from the proxy servlet to the remote user whose request was intercepted.

20. The computer program product as claimed in claim 19, wherein the connection initiated by the reverse proxy uses an HTTP (Hypertext Transfer Protocol) protocol, the response with which the proxy servlet routes each of the intercepted requests to the;

local web server by way of said reverse proxy is an HTTP response, and the new request with which the;

reverse proxy, routes the local web server's response to the proxy servlet is a new HTTP request.

21. The computer program product as claimed in claim 19, wherein multi-part MIME encoding is used to provide both a control channel and an application data channel between the reverse proxy and the proxy servlet.

22. The computer program product as claimed in claim 21, wherein the control channel is represented by an extensible markup language document that allows end-station HTTP headers to be exchanged between the proxy servlet and the reverse proxy and allows negotiation of channel handling characteristics between the proxy servlet and the reverse proxy.

23. The computer program product as claimed in claim 19, wherein the internet hosting web server provides virtual hosting support which allows the local web server to be viewed by the remote users with it's own host and domain name.

24. The computer program product as claimed in claim 20, wherein multiple outstanding HTTP requests between the reverse proxy and the proxy servlet exist to allow overlapped end station operations in which cookies or other HITP header annotations are used to relate outstanding remote-user requests flowing from the proxy servlet to the reverse proxy as HTTP responses to a corresponding one of the local web server's responses flowing from the reverse proxy to the proxy servlet as HTTP requests.

* * * * *